(12) United States Patent
Uneura et al.

(10) Patent No.: US 9,790,950 B2
(45) Date of Patent: Oct. 17, 2017

(54) TURBOCHARGER

(71) Applicant: IHI Corporation, Koto-ku (JP)

(72) Inventors: Yutaka Uneura, Tokyo (JP); Tomomi Otani, Tokyo (JP); Yuichi Daito, Tokyo (JP)

(73) Assignee: IHI Corporation, Koto-ku (JP)

( * ) Notice: Subject to any disclaimer, the term of this patent is extended or adjusted under 35 U.S.C. 154(b) by 364 days.

(21) Appl. No.: 14/548,869

(22) Filed: Nov. 20, 2014

(65) Prior Publication Data

US 2015/0078884 A1 Mar. 19, 2015

Related U.S. Application Data

(63) Continuation of application No. PCT/JP2013/067514, filed on Jun. 26, 2013.

(30) Foreign Application Priority Data

Jun. 29, 2012 (JP) ................................. 2012-146253

(51) Int. Cl.
*F04D 29/051* (2006.01)
*F16C 17/10* (2006.01)
(Continued)

(52) U.S. Cl.
CPC ......... *F04D 29/051* (2013.01); *F01D 25/166* (2013.01); *F01D 25/18* (2013.01);
(Continued)

(58) Field of Classification Search
CPC ............. F05D 2240/40; F05D 2240/52; F04D 29/051; F04D 29/0513; D01D 25/168; D01D 25/166; F16C 17/107
See application file for complete search history.

(56) References Cited

U.S. PATENT DOCUMENTS 5,308,169 A  5/1994 Baker et al.
5,454,646 A * 10/1995 Reisdorf ............... F01D 25/164
                                                    384/901
(Continued)

FOREIGN PATENT DOCUMENTS

CN   1201105 A   12/1998
CN   1379184 A   11/2002
(Continued)

OTHER PUBLICATIONS

Combined Chinese Office Action and Search Report issued Mar. 30, 2016 in Patent Application No. 201380031794.1 (with English translation of categories of cited documents).
(Continued)

*Primary Examiner* — Gregory Anderson
*Assistant Examiner* — Cameron Corday
(74) *Attorney, Agent, or Firm* — Oblon, McClelland, Maier & Neustadt, L.L.P.

(57) ABSTRACT

A turbocharger includes: a bearing provided in a turbocharger body, and configured to rotatably support a turbine shaft in an insertion hole formed in the bearing; and an opposing portion which faces an end surface of the bearing in an axial direction of the turbine shaft. An end-surface guide portion is provided to any one of an opposing surface of the bearing which faces the opposing portion, and an opposing surface of the opposing portion which faces the bearing. The end-surface guide portion configured to make the insertion hole and an outer peripheral edge of the end surface of the bearing in radial directions of the turbine shaft communicate with each other extends forward in a rotational direction of the turbine shaft from a part of the end surface of the bearing which communicates with the insertion hole.

8 Claims, 3 Drawing Sheets

(51) Int. Cl.
*F16C 33/10* (2006.01)
*F04D 29/057* (2006.01)
*F04D 29/063* (2006.01)
*F01D 25/16* (2006.01)
*F01D 25/18* (2006.01)
*F16C 27/02* (2006.01)
*F02B 39/14* (2006.01)
*F04D 25/02* (2006.01)

(52) U.S. Cl.
CPC ....... *F04D 29/057* (2013.01); *F04D 29/0513* (2013.01); *F04D 29/063* (2013.01); *F16C 17/107* (2013.01); *F16C 27/02* (2013.01); *F16C 33/107* (2013.01); *F02B 39/14* (2013.01); *F04D 25/024* (2013.01); *F05D 2220/40* (2013.01); *F05D 2240/52* (2013.01); *F05D 2240/53* (2013.01); *F05D 2240/54* (2013.01); *F05D 2250/15* (2013.01); *F05D 2260/607* (2013.01); *F16C 2360/24* (2013.01)

(56) References Cited

U.S. PATENT DOCUMENTS 6,126,414 A    10/2000   Koike
7,670,056 B2 *  3/2010   Petitjean .............. F01D 25/16
                                                      384/284
2002/0141862 A1* 10/2002 McEwen ............... F01D 25/18
                                                      415/111

FOREIGN PATENT DOCUMENTS

| CN | 101749321 A | 6/2010 |
| JP | S60-227011 A | 11/1985 |
| JP | H06-146910 A | 5/1994 |
| JP | H10-121977 A | 5/1998 |
| JP | 2002-357273 A | 12/2002 |
| JP | 2005-133635 A | 5/2005 |
| JP | 2007-023858 A | 2/2007 |
| JP | 2007-046642 A | 2/2007 |
| JP | 2008-190498 A | 8/2008 |
| JP | 2009-243365 A | 10/2009 |
| JP | 2010-121589 A | 6/2010 |

OTHER PUBLICATIONS

Office Action issued Apr. 12, 2016 in Japanese Patent Application No. 2014-522659.
International Search Report issued on Aug. 13, 2013 for PCT/JP2013/067514 filed on Jun. 26, 2013 with English Translation.
International Written Opinion mailed on Aug. 13, 2013 for PCT/JP2013/067514 filed on Jun. 26, 2013.

* cited by examiner

F ← → R

TURBOCHARGER

CROSS REFERENCE TO RELATED APPLICATIONS

This application is a continuation application of International Application No. PCT/JP2013/067514, filed on Jun. 26, 2013, which claims priority to Japanese Patent Application No. 2012-146253, filed on Jun. 29, 2012, the entire contents of which are incorporated by references herein.

BACKGROUND OF THE INVENTION

1. Field of the Invention

The present invention relates to a turbocharger including a bearing configured to receive thrust load.

2. Description of the Related Art

Turbochargers have been conventionally known in which a turbine shaft is rotatably supported by a bearing housing with a turbine impeller provided to one end of the turbine shaft, and with a compressor impeller provided to the other end of the turbine shaft. This turbocharger is connected to an engine. The turbine impeller is rotated by an exhaust gas discharged from the engine. The rotation of the turbine impeller is transmitted to the compressor impeller via the turbine shaft, and the compressor impeller is thus rotated. Thereby, the turbocharger compresses air with the rotation of the compressor impeller, and supercharges the engine with the compressed air.

A bearing configured to pivotally support the turbine shaft is provided inside the bearing housing. While supporting the turbine shaft, the bearing receives radial load and thrust load. Lubricant is supplied to the interstice between an end surface of the bearing in an axial direction of the turbine shaft and, for example, a thrust collar opposed to the end surface. It is not easy, however, for the lubricant to reach the interstice without any arrangements, because the thrust load makes the bearing and the thrust collar hit each other. In a turbocharger described in Japanese Patent Application Laid-Open Publication No. 2007-23858 (PTL 1), multiple grooves in which lubricant flows are provided to an end surface of a bearing to come into contact with a thrust collar, in such a way as to radially extend in radial directions of the bearing.

SUMMARY OF THE INVENTION

If a foreign substance enters the lubricant, the foreign substance moves along the inner peripheral surface of the bearing, and reaches the end surface of the bearing. Thereafter, because of centrifugal force associated with the rotation of the turbine shaft, the foreign substance, together with the lubricant, is forced out in the radial direction of the bearing and forward in the rotational direction of the turbine shaft. As a result, in the turbocharger described in PTL1, the foreign substance may run off the grooves in a circumferential direction and get caught between the thrust collar and the bearing, thereby damaging the bearing or occluding the grooves to hinder the lubricant from flowing in the grooves.

An object of the present invention is to provide a turbocharger capable of reducing damages on its bearing and improving its lubrication performance by improving a performance of the bearing to discharge a foreign substance that may enter lubricant.

A first aspect of the present invention provides a turbocharger which includes: a turbocharger body; a turbine shaft rotatably housed in the turbocharger body with a turbine impeller provided to one end of the turbine shaft and a compressor impeller provided to an opposite end of the turbine shaft; a bearing provided in the turbocharger body and configured to rotatably support the turbine shaft in an insertion hole formed in the bearing; and an opposing portion facing an end surface of the bearing in an axial direction of the turbine shaft. Here, an end-surface guide portion configured to make the insertion hole and an outer peripheral edge of the end surface of the bearing in radial directions of the turbine shaft communicate with each other is provided to any one of an opposing surface of the bearing which faces the opposing portion, and an opposing surface of the opposing portion which faces the bearing. Moreover, the end-surface guide portion extends forward in a rotational direction of the turbine shaft from a part of the end surface of the bearing which communicates with the insertion hole.

Here, the end-surface guide portion may form a passage configured to discharge a foreign substance, together with lubricant, from the opposing surface provided with the end-surface guide portion to outside of the opposing surface in the radial directions. Moreover, a direction of extension of the end-surface guide portion may be along a direction of movement of oil droplets of the lubricant receiving rotational force of the turbine shaft.

The bearing may be formed from a bush including a running surface configured to receive radial load of the turbine shaft with an oil film held between the running surface and the turbine shaft.

The running surface or an outer peripheral surface of the turbine shaft, which faces the running surface, may be provided with an running-surface guide portion which is formed from a groove extending from one end to an opposite end in the axial direction of the turbine shaft. Here, one end of the running-surface guide portion in the axial direction of the turbine shaft may communicate with the end-surface guide portion, and the one end of the running-surface guide portion in the axial direction of the turbine shaft may be located further forward in the rotational direction of the turbine shaft than the opposite end of the running-surface guide portion.

The running-surface guide portion may form a passage configured to discharge the foreign substance, together with the lubricant, from the running surface to the end-surface guide portion. Moreover, a direction of extension of the running-surface guide portion may be along the direction of the movement of the oil droplets of the lubricant receiving the rotational force of the turbine shaft.

The bearing may be formed from a semi-floating bearing whose movement in its rotational and axial directions is restricted by a pin provided to the turbocharger body.

A second aspect of the present invention provides a turbocharger which includes: a turbocharger body; a turbine shaft rotatably housed in the turbocharger body with a turbine impeller provided to one end of the turbine shaft and a compressor impeller provided to an opposite end of the turbine shaft; a thrust collar configured to rotate integrally with the turbine shaft; and a thrust bearing disposed facing the thrust collar in an axial direction of the turbine shaft, the turbine shaft inserted in an insertion hole formed in the thrust bearing, and the thrust bearing configured to receive thrust load of the turbine shaft via the thrust collar. Here, an end-surface guide portion configured to make the insertion hole and an outer peripheral edge of the thrust collar in radial directions of the turbine shaft communicate with each other is provided to any one of an opposing surface of the thrust bearing which faces the thrust collar, and an opposing surface of the thrust collar which faces the thrust bearing.

Moreover, the end-surface guide portion extends forward in a rotational direction of the turbine shaft from a part of an end surface of the thrust bearing which communicates with the insertion hole.

Here, the end-surface guide portion may form a passage configured to discharge a foreign substance, together with lubricant, from the opposing surface provided with the end-surface guide portion to outside of the opposing surface in the radial directions. Moreover, a direction of extension of the end-surface guide portion may be along a direction of movement of oil droplets of the lubricant receiving rotational force of the turbine shaft.

The present invention can reduce damages on the bearing and improve the lubrication performance by improving the performance of the bearing to discharge a foreign substance.

DESCRIPTION OF THE PREFERRED EMBODIMENTS

Referring to the accompanying drawings, detailed descriptions will be hereinbelow provided for an embodiment of the present invention. Dimensions, materials, concrete numerical values and the like in the embodiment are shown as examples just for the purpose of facilitating the understanding of the present invention, and do not limit the present invention unless otherwise indicated. In the specification and the drawings, components having virtually the same functions and configurations are denoted by the same reference signs and duplicated explanations are omitted, and components not directly related to the present invention are omitted from the drawings.

Figure 1:
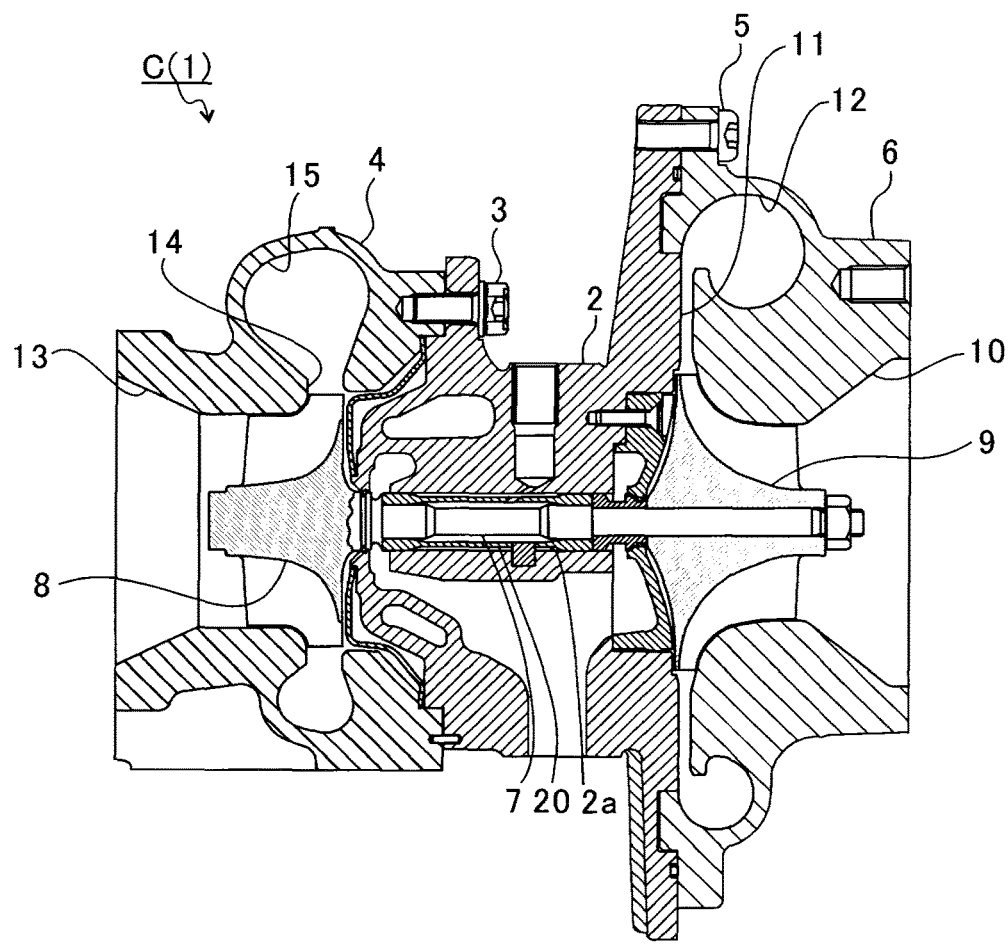
FIG. 1 is a schematic cross-sectional view of a turbocharger of an embodiment of the present invention.

FIG. 1 is a schematic cross-sectional view of a turbocharger C according to the embodiment. The following descriptions will be given with an arrow F direction in FIG. 1 pointing to the front of the turbocharger C, and with an arrow R direction in FIG. 1 pointing to the rear of the turbocharger C. As shown in FIG. 1, the turbocharger C includes a turbocharger body 1. The turbocharger body 1 includes: a bearing housing 2; a turbine housing 4 connected to the front of the bearing housing 2 by use of a fastener bolt 3; and a compressor housing 6 connected to the rear of the bearing housing 2 by use of a fastener bolt 5. These housings are integrated into the turbocharger body 1.

A bearing bore 2a is formed in the bearing housing 2. The bearing bore 2a penetrates through the bearing housing 2 in the front-rear direction of the turbocharger C. A turbine shaft 7 is rotatably supported by a bearing 20 described later provided to the bearing bore 2a. A turbine impeller 8 is integrally fixed to the front end portion (one end) of the turbine shaft 7. The turbine impeller 8 is rotatably housed in the turbine housing 4. In addition, a compressor impeller 9 is integrally fixed to the rear end portion (the other end) of the turbine shaft 7. The compressor impeller 9 is rotatably housed in the compressor housing 6.

An inlet port 10 is formed in the compressor housing 6. The inlet port 10 is opened toward the rear of the turbocharger C, and is connected to an air cleaner, albeit not illustrated. Furthermore, when the bearing housing 2 and the compressor housing 6 are connected together by use of the fastener bolt 5, the opposing surfaces of the two housings 2, 6 form a diffuser passage 11 configured to compress and boost air. The diffuser passage 11 is shaped like a ring, extending from its inner to outer sides in radial directions of the turbine shaft 7 (the compressor impeller 9). The inner side of the diffuser passage 11 in the radial directions communicates with the inlet port 10 via the compressor impeller 9.

In addition, the compressor housing 6 is provided with a compressor scroll passage 12. The compressor scroll passage 12 is shaped like a ring, and is situated outward of the diffuser passage 11 in the radial directions of the turbine shaft 7 (the compressor impeller 9). The compressor scroll passage 12 communicates with an intake port of an engine, albeit not illustrated, and communicates with the diffuser passage 11 as well. For this reason, once the compressor impeller 9 rotates, a fluid is taken into the compressor housing 6 from the inlet port 10; the pressure of the fluid taken thereinto is boosted by the diffuser passage 11 and the compressor scroll passage 12; and the resultant fluid is guided to the intake port of the engine.

A discharge port 13 is formed in the turbine housing 4. The discharge port 13 is opened toward the front of the turbocharger C, and is connected to an exhaust emission control system, albeit not illustrated. Furthermore, the turbine housing 4 is provided with a passage 14 and a turbine scroll passage 15. The turbine scroll passage 15 is shaped like a ring, and is situated outside the passage 14 in the radial directions of the turbine shaft 7 (the turbine impeller 8). The turbine scroll passage 15 communicates with a gas inlet port, not illustrated, to which an exhaust gas emitted from an exhaust manifold of the engine not illustrated is guided. The turbine scroll passage 15 communicates with the passage 14 as well. The exhaust gas is guided from the gas inlet port to the turbine scroll passage 15, and is further guided to the discharge port 13 via the passage 14 and the turbine impeller 8. For this reason, during its flowing process, the exhaust gas rotates the turbine impeller 8. Thereafter, the torque of the turbine impeller 8 is transmitted to the compressor impeller 9 via the turbine shaft 7. The torque of the compressor impeller 9 boosts the pressure of the fluid as described above, and the resultant fluid is guided to the intake port of the engine.

Figure 2:
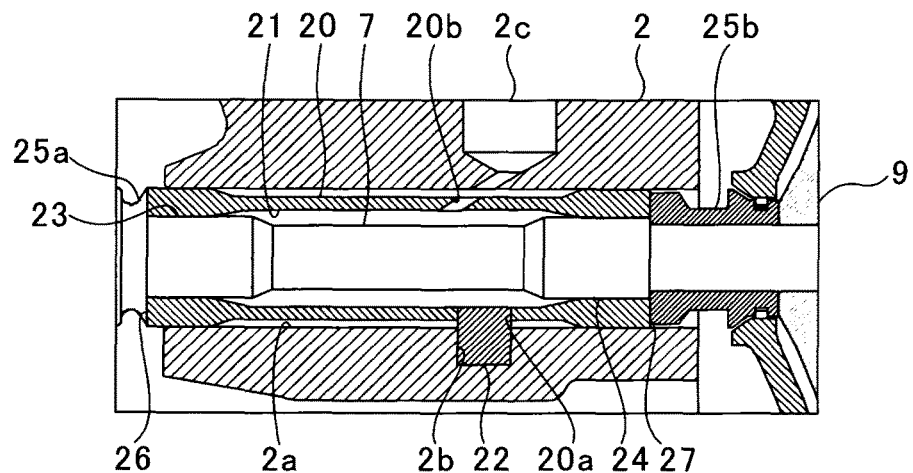
FIG. 2 is a partially magnified view of the inside of a bearing housing shown in FIG. 1.

FIG. 2 is a partially magnified view of the inside of the bearing housing 2 shown in FIG. 1. Referring to the FIG. 2, descriptions will be hereinbelow provided for a supporting structure in which the bearing 20 housed in the turbocharger body 1 supports the turbine shaft 7.

In the embodiment, the bearing 20 is formed from a plain bearing (bush) which allows sliding motion of the turbine shaft 7 in its inside, and which produces oil-film pressure between itself and the turbine shaft V. The bearing 20 is provided with an insertion hole 21 which penetrates through the bearing 20 in the axial direction. The bearing 20 is inserted in the bearing bore 2a in the bearing housing 2.

The bearing 20 is provided with a through-hole 20a which penetrates through the bearing 20 in a direction perpendicular to the axial direction. A pin 22 is inserted in the through-hole 20a. The pin 22 is also inserted in a positioning hole 2b which is provided in the inside of the bearing bore 2a in the bearing housing 2. The insertion of the pin 22 in these holes makes the pin 22 restrict the movement of the bearing 20 in the rotational direction and in the axial direction.

In the embodiment, the bearing 20 rotatably supports the turbine shaft 7 which is inserted in the insertion hole 21. It should be noted that the movement of the bearing 20 is restricted by the pin 22. The bearing 20 accordingly functions as a so-called semi-floating bearing.

Running surfaces 23, 24 are provided in a turbine impeller 8-side portion and a compressor impeller 9-side portion of the inner peripheral surface of the bearing 20. The running surfaces 23, 24 receive radial load from the turbine shaft 7 while retaining oil films of lubricant, which is supplied to the inside of the bearing 20, between themselves and the turbine shaft 7. It should be noted that the lubricant is supplied via an oil passage 2c formed in the bearing housing 2, and via an oil passage 20b formed in the bearing 20 and provided in a position facing the oil passage 2c.

A thrust collar 25a (an opposing portion) is fixed to the vicinity of a turbine impeller 8-side end portion of the turbine shaft 7, and rotates integrally with the turbine shaft 7. The thrust collar 25a is opposed to an end surface 26 of the bearing 20 in the axial direction of the turbine shaft 7, and makes thrust load of the turbine shaft 7 act on the end surface 26.

An oil thrower member 25b (the other opposing portion) is fixed to the vicinity of a compressor impeller 9-side end portion of the turbine shaft 7, and rotates integrally with the turbine shaft 7. The oil thrower member 25b is configured to prevent lubricant leaking out of the bearing housing 2 from reaching the back surface of the compressor impeller 9 by throwing the lubricant in the radial directions by use of centrifugal force associated with the rotation of the turbine shaft 7. The oil thrower member 25b is opposed to an end surface 27 of the bearing 20 in the axial direction of the turbine shaft 7. The oil thrower member 25b further functions as a thrust collar configured to make the thrust load of the turbine shaft 7 act on the end surface 27.

Here, brief descriptions will be provided for a process for assembling the bearing 20 and the turbine shaft 7. In the assembling process, first of all, the bearing 20 is fixed in the bearing bore 2a in the bearing housing 2. While this state is kept, starting with its rear end portion, the turbine shaft 7 is inserted into the insertion hole 21 in the bearing 20 with the turbine impeller 8 fixed to the front end portion of the turbine shaft 7.

Thereafter, the oil thrower member 25b is inserted into the bearing bore 2a in a way to come into contact with the rear end of the turbine shaft 7 projecting toward the compressor impeller 9 in the bearing bore 2a, and is fixed to the turbine shaft 7. The oil thrower member 25b is fixed to the turbine shaft 7 in a state of contact with step portions formed in the turbine shaft 7. At this time, a distance between the thrust collar 25a and the oil thrower member 25b is designed to be slightly longer than the axial-direction length of the bearing 20.

By this, when the turbine shaft 7 moves in its axial direction, the thrust collar 25a comes into surface contact with the end surface 26 of the bearing 20, and the oil thrower member 25b comes into surface contact with the end surface 27 of the bearing 20. In other words, the bearing 20 receives the thrust load of the turbine shaft 7 through the thrust collar 25a and the oil thrower member 25b.

Figure 3A:
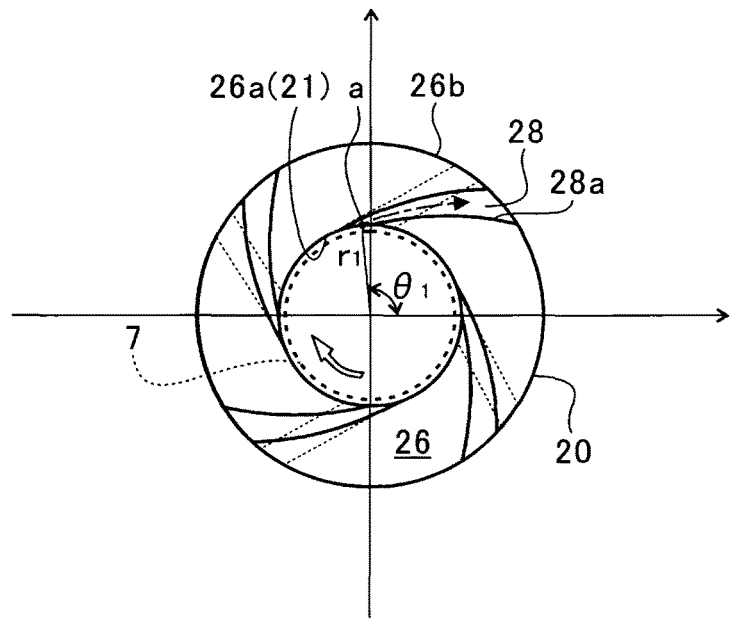
FIG. 3A is a view of an end surface of a bearing of the embodiment of the present invention, which is taken from the front of the turbocharger body.
Figure 3B:
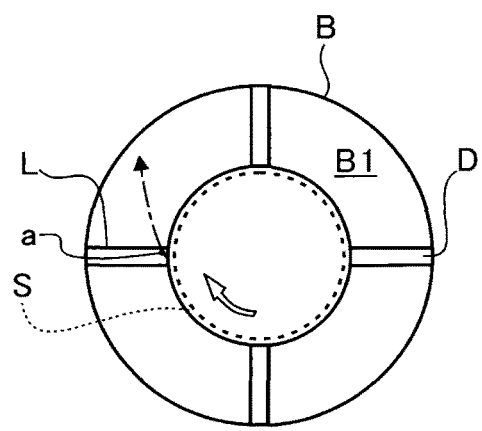
FIG. 3B is a front view of a bearing which is included in a conventional turbocharger shown as a comparative example.

FIG. 3A is a view of the end surface 26 of the bearing 20 which is taken from the front of the turbocharger body 1. FIG. 3B shows a bearing B provided to a conventional turbocharger as a comparative example. In the comparative example, an end surface B1 of the bearing B is provided with multiple grooves D in which lubricant flows. The grooves D radially extend in radial directions of the bearing B. A turbine shaft S (indicated with a dashed line in FIG. 3B) rotates in the bearing B in a direction indicated with a white arrow. For this reason, in case a foreign substance a enters a groove D provided in the bearing B, the foreign substance a is forced out in a radial direction of the bearing B and forward in a rotational direction of the turbine shaft S due to centrifugal force associated with the rotation of the turbine shaft S, as indicated with a chain-lined arrow. Thereafter, the foreign substance a is more likely to bite into a boundary area L of the groove D which is located forward in the rotational direction of the turbine shaft S, or to get caught between the thrust collar and the bearing B after coming into contact with the boundary area L and pushed out by the thrust collar.

As shown in FIG. 3A, end-surface guide portions (first guide portions) 28 are provided to the opposed surfaces of the bearing 20 and the thrust collar 25a. In the embodiment, the end-surface guide portions 28 are provided to the end surface 26 of the bearing 20. Each end-surface guide portion 28 is formed as a groove (a recessed portion) configured to make the outer peripheral edge 26b and the inner peripheral edge 26a (the insertion hole 21) of the end surface 26 of the bearing 20 in a radial direction of the turbine shaft 7 (indicated with a dashed line in FIG. 3A) communicate with each other. Furthermore, each end-surface guide portion 28 forms a passage configured to discharge a foreign substance a, together with lubricant, from the opposed surfaces of the thrust collar 25a and the end surface 26 to the outside in the radial direction.

It should be noted that like the end surface 26, the end surface 27 of the bearing 20 is provided with end-surface guide portions 28. The configurations of the end-surface guide portions 28 provided to the end surface 26 and the end surface 27 are virtually the same. For this reason, the following descriptions will be given to the end-surface guide portions 28 provided to the end surface 26.

As shown in FIG. 3A, the turbine shaft 7 rotates in a clockwise direction (indicated with a white arrow in FIG. 3A). Each end-surface guide portion 28 is directed from the inner peripheral edge 26a to the outer peripheral edge 26b of the end surface 26 of the bearing 20 in a radial direction, and extends forward in the rotational direction of the turbine shaft 7.

When the turbine shaft 7 rotates, the foreign substance a, together with the lubricant, moves in a direction indicated with a chain-lined arrow due to centrifugal force associated with the rotation of the turbine shaft 7. In other words, the foreign substance a is forced out in the radial direction of the bearing 20 and forward in the rotational direction of the turbine shaft 7. On the other hand, the end-surface guide portion 28 is provided extending in the direction in which the lubricant and the foreign substance a are forced out. For this reason, the foreign substance a is less likely to become caught between the thrust collar 25a and a boundary area 28a which is located forward in the rotational direction of the turbine shaft 7. Furthermore, the foreign substance a in a state of being in contact with the boundary area 28a is less likely to be forced out by the thrust collar 25a. In other words, the foreign substance a is less likely to be caught between the thrust collar 25a and the bearing 20.

To put it concretely, the direction of the extension of each end-surface guide portion 28 is the same as a direction of movement of oil droplets of the lubricant receiving the rotational force of the turbine shaft 7. The foreign substance a moves together with the lubricant. The direction of the movement of the foreign substance a is almost the same as the direction of the movement of the lubricant (the oil droplets).

The direction of the movement of an oil droplet can be found on the basis of Equations 1 to 5 given below. Here, let us assume a polar coordinate system in which: the origin is the center of the bearing 20 in the radial directions; θ denotes a phase angle which is positive when measured counterclockwise from the horizontal direction (the left-right direction in FIG. 3A); and r denotes the distance from the origin. As an initial condition, let us assume that at time t=0, an oil droplet is located at an inner peripheral edge 26a of the end surface 26; and the phase angle of the oil droplet in the circumferential direction is represented by θ1, while the distance of the oil droplet from the origin is represented by r1. Let us further assume that an angular velocity ω of the oil droplet is what is measured when the number of revolutions of the turbine shaft 7 is at an assumed maximum value.

To begin with, the velocity ur of the oil droplet in a radial direction is expressed with $$u_r = \frac{dr}{dt} = r\omega^2 t, \quad \text{(Equation 1)}$$

where: r represents the distance of the oil droplet from the origin; ω represents the angular velocity of the oil droplet; and t represents time.

Furthermore, at time t, the phase angle θ of the oil droplet in the circumferential direction, and the velocity uθ of the oil droplet in the circumferential direction are respectively expressed with $$\theta = \omega t + \theta_1 \quad \text{(Equation 2)}$$

and $$u_\theta = r\omega \quad \text{(Equation 3)}.$$

In this respect, Equation 4 is obtained by transforming Equation 1 above, $$\frac{dr}{r} = \omega^2 t \, dt. \quad \text{(Equation 4)}$$

Equation 5 is derived by integrating Equation 4 on the basis of the above-mentioned initial condition (with regard to the distance of the oil droplet from the origin, r=r1 at time t=0), $$\int_{r_1}^{r} \frac{dr}{r} = \int_0^t \omega^2 t \, dt. \quad \text{(Equation 5)}$$

By a series of expansion of the integral expressions in both sides, Equation 5 is transformed into Equation 6, Equation 7 and Equation 8:

$$[\ln r]_{r_1}^{r} = \left[\frac{1}{2}\omega^2 t^2\right]_0^t, \quad \text{(Equation 6)}$$

$$\ln r - \ln r_1 = \frac{1}{2}\omega^2 t^2 - 0, \quad \text{(Equation 7)}$$

and $$\ln\left(\frac{r}{r_1}\right) = \frac{1}{2}(\omega t)^2. \quad \text{(Equation 8)}$$

Equation 9 is derived by substituting ωt=θ−θ1, which is obtained by solving Equation 2 for ωt, in the right side of Equation 8, $$\ln\left(\frac{r}{r_1}\right) = \frac{(\theta - \theta_1)^2}{2}. \quad \text{(Equation 9)}$$

Subsequently, Equation 10 below is derived by transforming Equation 9, $$r = r_1 \exp\left[\frac{(\theta - \theta_1)^2}{2}\right]. \quad \text{(Equation 10)}$$

Referring to Equation 10, it is learned that the distance r of the oil droplet from the origin is determined by the initial position of the oil droplet (the position at time t=0) and the phase angle θ of the oil droplet in the circumferential direction, but does not depend on time t.

Each end-surface guild portion 28 extends in such a direction of the movement of the oil droplet as specified by Equation 5. For this reason, as oil droplets move, the foreign substance a, together with the oil droplets, moves along the end-surface guide portion 28 from the inner peripheral edge 26a to the outer peripheral edge 26b, and is eventually discharged. Consequently, the turbocharger C of the embodiment is capable of remarkably decreasing the likelihood that the foreign substance is forced out of the end-surface guide portion 28 in the circumferential direction and is caught between the thrust collar 25 and the bearing 20.

Figure 4:
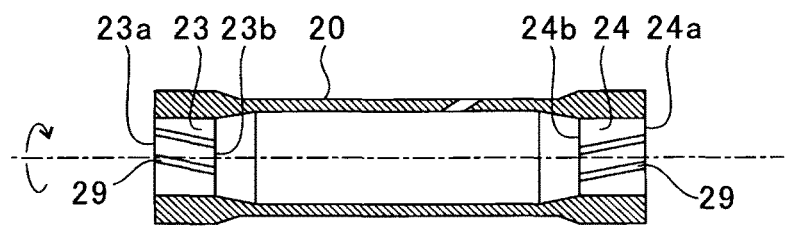
FIG. 4 is a cross-sectional view of the bearing of the embodiment of the present invention, which is taken along a plane in parallel with the axial direction of the bearing.

FIG. 4 is a cross-sectional view of the bearing 20 taken along a plane in parallel with the axial direction of the bearing 20. As shown in FIG. 4, the running surfaces 23, 24 are provided with running-surface guide portions (second guide portions) 29. The running-surface guide portions 29 are grooves which recess outward in the radial directions of the turbine shaft 7. The running-surface guide portions 29 form passages configured to discharge foreign substances a, together with the lubricant, from the running-surfaces 23, 24 toward the end-surface guide portions 28.

The running-surface guide portions 29 in the running surface 23 extend from one end 23a to the opposite end 23b of the running surface 23 in the axial direction of the turbine shaft 7. Similarly, the running-surface guide portions 29 in the running surface 24 extend from one end 24a to the opposite end 24b of the running surface 24 in the axial direction of the turbine shaft 7. In addition, at the one end 23a side in the axial direction of the turbine shaft 7, the running-surface guide portions 29 in the running surface 23 communicate with the end-surface guide portions 28 in the end surface 26. Similarly, at the one end 24a side in the axial direction of the turbine shaft 7, the running-surface guide portions 29 in the running surface 24 communicate with the end-surface guide portions 28 in the end surface 27. Of all the guide portions 29, the one ends 23a, 24a in the axial direction of the turbine shaft 7 are located further forward in the rotational direction (indicated with an arrow in the drawing) of the turbine shaft 7 than the opposite ends 23b, 24b. In other words, all the guide portions 29 extend in the direction in which the foreign substances a on the running surfaces 23, 24 are forced out due to the rotation of the turbine shaft 7.

The running-surface guide portions 29 with the foregoing configuration act on the foreign substances a as in the case of the end-surface guide portions 28. In other words, even if the foreign substances a are forced out, by the turbine shaft 7, forward in the rotational direction of the turbine shaft 7, the foreign substances a are less likely to get caught between the running surfaces 23, 24 and the bearing 20 since the running-surface guide portions 29 are provided extending in the direction in which the foreign substances a are forced out.

The directions of the extension of the running-surface guide portions 29 are along the directions of the movement of the oil droplets of the lubricant receiving the rotational force of the turbine shaft 7. Like the end-surface guide portions 28 described above, the running-surface guide portions 29 are capable of remarkably decreasing the likelihood that the foreign substances a are forced out of the running-surface guide portions 29 in the circumferential direction and are caught between the running surfaces 23, 24 and the bearing 20.

Modified Examples

Figure 5:
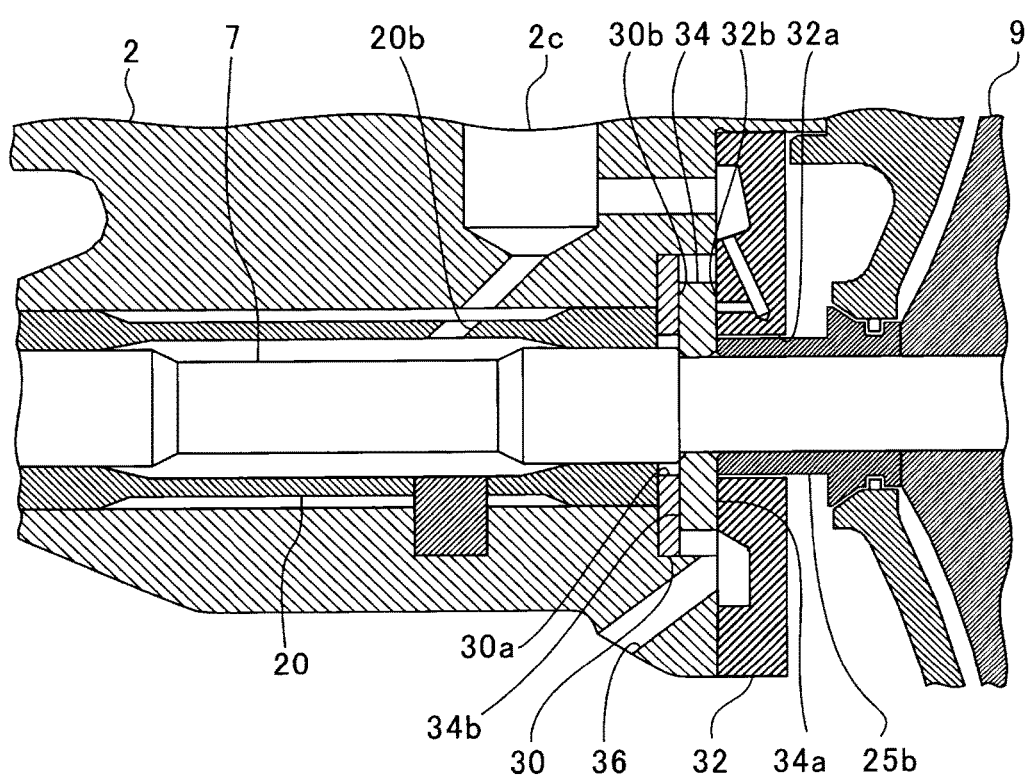
FIG. 5 is a schematic cross-sectional view of the inside of a bearing housing of a modified example of the embodiment of the present invention.

FIG. 5 is a schematic cross-sectional view of the inside of a bearing housing 2 of a modified example of the embodiment. As shown in FIG. 5, in addition to the semi-floating metal (the bearing 20), thrust bearings 30, 32 and a thrust collar 34 are arranged in the modified example. As shown in FIG. 5, the thrust collar 34 is disposed on a compressor impeller 9-side portion of the turbine shaft 7. The thrust bearings 30, 32 are disposed, respectively, on one axial-direction side (the left side of the thrust collar 34 in FIG. 5) and an opposite axial-direction side (the right side of the thrust collar 34 in FIG. 5) of the thrust collar 34 (the opposing portion).

The thrust collar 34 is fixed to the turbine shaft 7, and rotates integrally with the turbine shaft 7. The thrust collar 34 includes: an opposing surface 34b which faces the thrust bearing 30; and an opposing surface 34a which faces the thrust bearing 32.

The thrust bearing 30 includes: a through-hole 30a which penetrates through the thrust bearing 30 in the axial direction of the turbine shaft 7; and an opposing surface 30b which faces the opposing surface 34b of the thrust collar 34. The thrust bearing 32 includes: a through-hole 32a which penetrates through the thrust bearing 32 in the axial direction of the turbine shaft 7; and an opposing surface 32b which faces the opposing surface 34a of the thrust collar 34. The turbine shaft 7 is inserted in the through-holes 30a, 32a. Accordingly, the thrust bearings 30, 32 receive load of the turbine shaft 7 which is exerted in the axial direction of the turbine shaft 7. Furthermore, the turbine shaft 7 and the thrust bearings 30, 32 have a relationship of relative rotation between them.

An oil passage 2c branches off an oil passage 20b into another channel and thus communicates with the thrust bearing 32 on the side of the compressor impeller 9 as well. Lubricant is supplied to the opposing surface 32b of the thrust bearing 32 and the opposing surface 34a of the thrust collar 34 to lubricate the thrust bearing 32 and the thrust collar 34.

Furthermore, the lubricant is supplied to the bearing 20 via the oil passage 20b, and thereafter flows to the thrust bearing 30 and the thrust collar 34. Accordingly, the lubricant is supplied to the opposing surface 30b of the thrust bearing 30 and the opposing surface 34b of the thrust collar 34 to lubricates the thrust bearing 30 and the thrust collar.

After used for the lubrication, the lubricant is discharged via an oil discharging passage 36 provided in the bearing housing 2.

End-surface guide portions are provided to the opposing surface 30b formed in the thrust bearing 30. The end-surface guide portions have a shape similar to that of the end-surface guide portions 28 shown in FIG. 3A, and make the through-hole 30a and the outer peripheral edge of the thrust collar 34 in the radial directions of the turbine shaft 7 communicate with each other.

Starting at their parts communicating with the through-hole 30a, the end-surface guide portions of the modified example extend forward in the rotational direction of the turbine shaft 7. The end-surface guide portions form passages configured to discharge foreign substances a, together with the lubricant, from the opposing surfaces 30b, 34b of the thrust bearing 30 and the thrust collar 34 to the outside in the radial directions. This makes it possible to improve the capability of discharging the foreign substances a.

In addition, the directions of the extension of the end-surface guide portions provided to the opposing surface 30b are the same as the directions of the movement of the oil droplets of the lubricant receiving the rotational force of the turbine shaft 7. This makes it possible to further improve the capability of discharging the foreign substances a.

The foregoing descriptions have been provided for the case where the end-surface guide portions are provided to the opposing surface 30b of the thrust bearing 30. Instead, however, the end-surface guide portions may be provided to the opposing surface 34b of the thrust collar 34.

The foregoing embodiment has described the case where the bearing 20 is formed from the semi-floating bearing. Instead, however, the bearing 20 may be formed from a full-floating metal. In this case, the full-floating metal rotates relative to the turbine shaft 7 at a smaller number of revolutions than the turbine shaft 7 rotates. For this reason, the provision of end-surface guide portions 28 extending forward in the rotational direction of the turbine shaft 7 makes it possible to improve the capability of discharging the foreign substances a.

The foregoing embodiment has described the case where the end-surface guide portions 28 are provided to the end surfaces 26, 27 of the bearing 20 which respectively face the thrust collar 25a and the oil thrower member 25b. Instead, however, the end-surface guide portions 28 may be provided to the end surfaces of the thrust collar 25a and the oil thrower member 25b separately.

Furthermore, the foregoing embodiment has described the case where the running-surface guide portions 29 are provided to the running surfaces 23, 24 of the bearing 20. Instead, however, the running-surface guide portions 29 may be provided to outer peripheral surfaces of the turbine shaft 7 which face the running surfaces 23, 24.

Moreover, as indicated with dashed lines in FIG. 3A, each end-surface guide portion 28 may linearly extend in a direction tangent to the inner peripheral edge 26a, and forward in the rotational direction of the turbine shaft 7. A foreign substance in each end-surface guide portion 28 is under the influence of the rotational force (the centrifugal force) of the turbine shaft 7 which the end-surface guide portion 28 receives through the lubricant. The influence becomes smaller as the depth (groove depth) of the end-surface guide portion 28 becomes larger. For this reason, the track of each foreign substance tends to be in a straight line extending in the direction tangent to the inner peripheral edge 26a. Accordingly, even if the end-surface guide portions 28 are linearly extended in parallel with the tangent directions, the same capability of discharging foreign substances as described above can be obtained.

Although the foregoing descriptions have been provided for the preferred embodiment of the present invention with reference to the accompanying drawings, it goes without saying that the present invention is not limited to such an embodiment. It is clear that those skilled in the art could arrive at various modified examples or revised examples within the scope of claims. It should be understood that such modified and revised examples are naturally encompassed by the technical scope of the present invention as well.

What is claimed is:

1. A turbocharger comprising:
a turbocharger body;
a turbine shaft rotatably housed in the turbocharger body with a turbine impeller provided to one end of the turbine shaft and a compressor impeller provided to an opposite end of the turbine shaft;
a bearing provided in the turbocharger body and configured to rotatably support the turbine shaft in an insertion hole formed in the bearing; and
an opposing portion facing an end surface of the bearing in an axial direction of the turbine shaft, wherein
an end-surface guide portion configured to make the insertion hole and an outer peripheral edge of the end surface of the bearing in radial directions of the turbine shaft communicate with each other is provided to any one of an opposing surface of the bearing which faces the opposing portion, and an opposing surface of the opposing portion which faces the bearing,
the end-surface guide portion extends forward in a rotational direction of the turbine shaft from a part of the end surface of the bearing which communicates with the insertion hole,
the end-surface guide portion forms a passage configured to discharge a foreign substance, together with lubricant, from the opposing surface provided with the end-surface guide portion to outside of the opposing surface in the radial directions,
wherein an oil droplet of the lubricant receives rotation force from the turbine shaft and follows the passage, and the motion of the oil droplet fulfills the following equation:

$$r = r_1 \exp\left[\frac{(\theta - \theta_1)^2}{2}\right]$$

where r denotes a distance of the oil droplet from an origin being a center of the bearing, $\theta$ denotes a phase angle of the oil droplet, $r_1$ denotes an initial distance of the oil droplet from the origin, and $\theta_1$ denotes an initial phase angle of the oil droplet.

2. The turbocharger according to claim 1, wherein the bearing is formed from a bush including a running surface configured to receive radial load of the turbine shaft with an oil film held between the running surface and the turbine shaft.

3. The turbocharger according to claim 2, wherein
the running surface or an outer peripheral surface of the turbine shaft, which faces the running surface, is provided with an running-surface guide portion which is formed from a groove extending from one end to an opposite end in the axial direction of the turbine shaft,
one end of the running-surface guide portion in the axial direction of the turbine shaft communicates with the end-surface guide portion, and
the one end of the running-surface guide portion in the axial direction of the turbine shaft is located further forward in the rotational direction of the turbine shaft than the opposite end of the running-surface guide portion.

4. The turbocharger according to claim 3, wherein
the running-surface guide portion forms a passage configured to discharge the foreign substance, together with the lubricant, from the running surface to the end-surface guide portion, and
a direction of extension of the running-surface guide portion is along the direction of the movement of the oil droplet of the lubricant receiving the rotational force of the turbine shaft.

5. The turbocharger according to claim 4, wherein the bearing is formed from a semi-floating bearing whose movement in its rotational and axial directions is restricted by a pin provided to the turbocharger body.

6. The turbocharger according to claim 3, wherein the bearing is formed from a semi-floating bearing whose movement in its rotational and axial directions is restricted by a pin provided to the turbocharger body.

7. The turbocharger according to claim 2, wherein the bearing is formed from a semi-floating bearing whose movement in its rotational and axial directions is restricted by a pin provided to the turbocharger body.

8. A turbocharger comprising:
a turbocharger body;
a turbine shaft rotatably housed in the turbocharger body with a turbine impeller provided to one end of the turbine shaft and a compressor impeller provided to an opposite end of the turbine shaft;
a thrust collar configured to rotate integrally with the turbine shaft; and
a thrust bearing disposed facing the thrust collar in an axial direction of the turbine shaft, the turbine shaft inserted in an insertion hole formed in the thrust bearing, and the thrust bearing configured to receive thrust load of the turbine shaft via the thrust collar, wherein
an end-surface guide portion configured to make the insertion hole and an outer peripheral edge of the thrust collar in radial directions of the turbine shaft communicate with each other is provided to any one of an opposing surface of the thrust bearing which faces the thrust collar, and an opposing surface of the thrust collar which faces the thrust bearing,
the end-surface guide portion extends forward in a rotational direction of the turbine shaft from a part of an end surface of the thrust bearing which communicates with the insertion hole,
the end-surface guide portion forms a passage configured to discharge a foreign substance, together with lubricant, from the opposing surface provided with the end-surface guide portion to outside of the opposing surface in the radial directions, wherein an oil droplet of the lubricant receives rotation force from the turbine shaft and follows the passage, and the motion of the oil droplet fulfills the following equation:

$$r = r_1 \exp\left[\frac{(\theta - \theta_1)^2}{2}\right]$$

where r denotes a distance of the oil droplet from an origin being a center of the bearing, $\theta$ denotes a phase angle of the oil droplet, $r_1$ denotes an initial distance of the oil droplet from the origin, and $\theta_1$ denotes an initial phase angle of the oil droplet.

* * * * *